(12) United States Patent  (10) Patent No.: US 7,649,816 B2
Itoga et al.  (45) Date of Patent: Jan. 19, 2010

(54) OPTICAL DISK RECORDING SYSTEM FOR RECORDING VISIBLE IMAGES CAPABLE OF HANDLING "BUFFER UNDER RUN" ERRORS

(75) Inventors: Hisanori Itoga, Hamamatsu (JP); Seiya Yamada, Shimada (JP); Jun Asami, Hamamatsu (JP); Tatsuo Fushiki, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 736 days.

(21) Appl. No.: 11/476,626

(22) Filed: Jun. 29, 2006

(65) Prior Publication Data

US 2007/0041291 A1 Feb. 22, 2007

(30) Foreign Application Priority Data

Jun. 30, 2005 (JP) ............................. 2005-191238

(51) Int. Cl.
 G11B 7/0045 (2006.01)
 G11B 7/007 (2006.01)
(52) U.S. Cl. .................................. 369/47.33; 369/53.12
(58) Field of Classification Search ......... 347/224–264; 369/47.28–47.34
 See application file for complete search history.

(56) References Cited

U.S. PATENT DOCUMENTS

| 5,815,472 | A | * | 9/1998 | Kuroda et al. ............. 369/47.33 |
| 2002/0075778 | A1 | | 6/2002 | Banno |
| 2002/0101803 | A1 | | 8/2002 | Hayashi et al. |
| 2002/0118617 | A1 | | 8/2002 | Hyun |
| 2003/0072229 | A1 | | 4/2003 | Hasegawa et al. |
| 2005/0094513 | A1 | * | 5/2005 | Takata et al. ............. 369/47.32 |

FOREIGN PATENT DOCUMENTS

| EP | 1 308 938 A2 | 5/2003 |
| EP | 1 429 319 A2 | 6/2004 |
| JP | 11-283356 A | 10/1999 |
| JP | 2002-203321 A | 7/2002 |
| JP | 2003-16649 A | 1/2003 |
| JP | 2004-30832 A | 1/2004 |
| JP | 2004-39019 A | 2/2004 |
| WO | WO 2006/021897 A1 | 3/2006 |

OTHER PUBLICATIONS

European Search Report dated May 11, 2009 (six (6) pages).
Notification of Reasons For Refusal dated Jun. 19, 2007 with an English translation of the pertinent portions (Five (5) pages).

* cited by examiner

Primary Examiner—Andrea L Wellington
Assistant Examiner—Nathan Danielsen
(74) Attorney, Agent, or Firm—Crowell & Moring LLP

(57) ABSTRACT

When "buffer under run" (BUR) occurs during recording of a visible image on an optical disk, recording operation is interrupted. As in the case of type A, when BUR1 occurs after data have been transferred through an integral multiple of one revolution, data are recorded continuously from a reference angle position without host device discarding data. As in the case of type B, when BUR2 occurs after data have been transferred in a value which is other than the integral multiple of one revolution, data corresponding to a duration from the position where BUR occurs to the start of the next revolution are discarded, data are continuously recorded from the reference angle position. Thereby, rendering can be spliced in a visually-smooth manner. Further, as in the case of type C, when the volume of data remaining in a buffer has become equal to or less than a "buffer under run" threshold value, subsequent transfer of data from the host device may be interrupted, and rendering may be resumed without the host device discarding data.

10 Claims, 6 Drawing Sheets

FIG. 3A  FIG. 3B  FIG. 3C
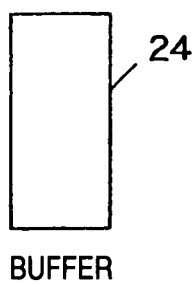
BUFFER
THE VOLUME OF DATA TRANSFERRED IN ONE OPERATION
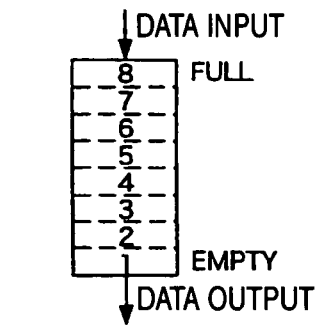
FIG. 3D  FIG. 3E
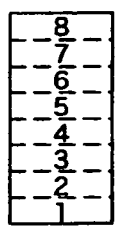
EMPTY STATUS OF BUFFER
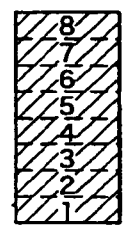
FULL STATUS OF BUFFER
FIG. 3F  FIG. 3G  FIG. 3H
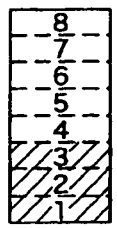
THRESHOLD VALUE OF BUFFER UNDER RUN
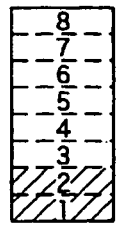
THRESHOLD VALUE OF BUFFER UNDER RUN
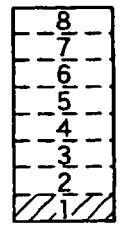
THRESHOLD VALUE OF BUFFER UNDER RUN

FIG. 4

| STATUS REGISTER | | | | | | | |
|---|---|---|---|---|---|---|---|
| 7 | 6 | 5 | 4 | 3 | 2 | 1 | 0 |
| BSY | DRDY | # | # | DRQ | obs | obs | ERR |

BSY BIT (BUSY)
    0 : WHEN DEVICE IS IDLE
    1 : WHEN DEVICE IS BUSY

DRQ BIT (DATA REQUEST)
    0 : NO REQUEST FOR TRANSFERRING DATA
    1 : WHEN REQUEST FOR TRANSFERRING DATA IS ISSUED

ERR BIT (ERROR)
    0 : NO ERROR
    1 : WHEN COMMAND HAS CAUSED AN ERROR

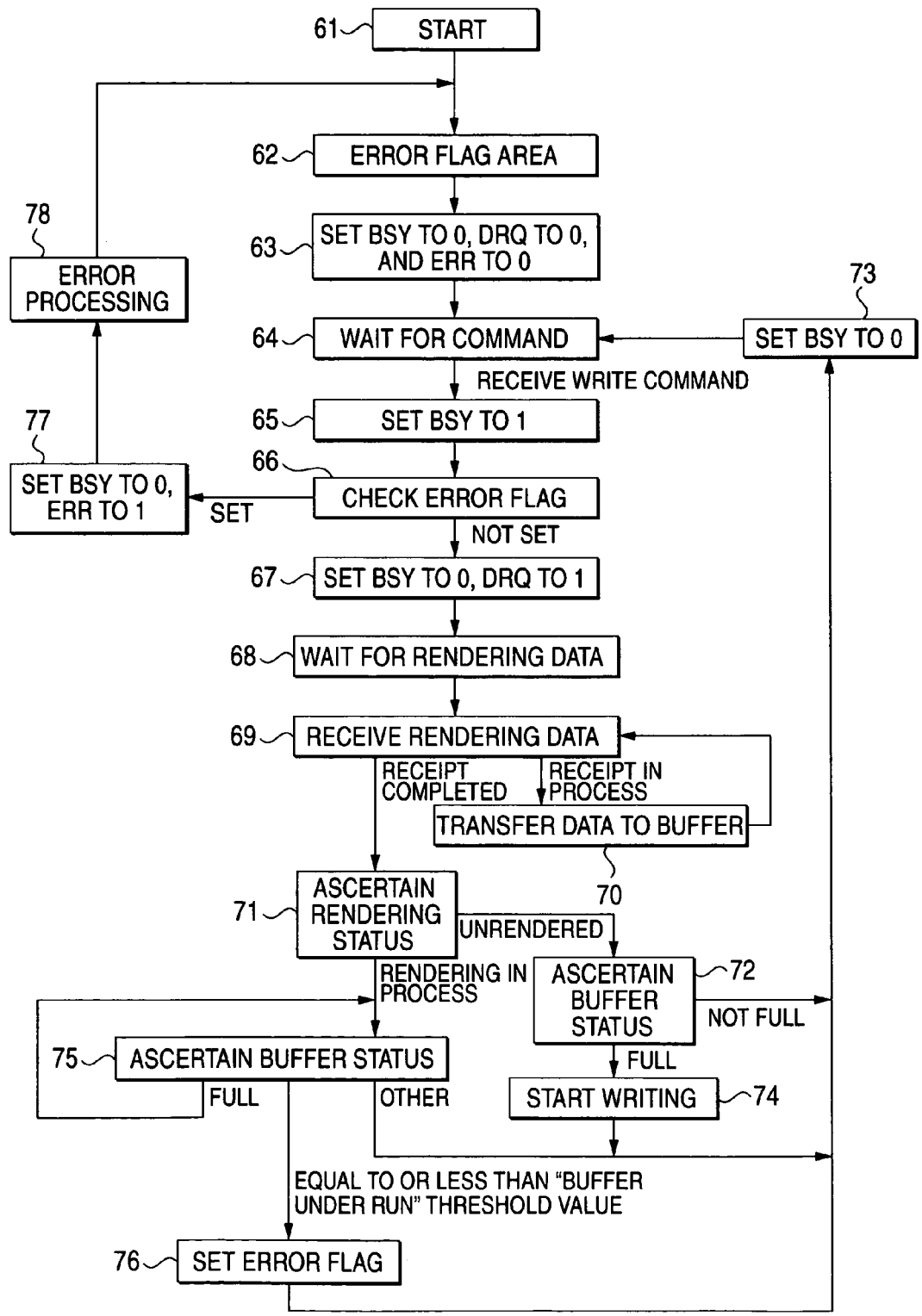

OPTICAL DISK RECORDING SYSTEM FOR RECORDING VISIBLE IMAGES CAPABLE OF HANDLING "BUFFER UNDER RUN" ERRORS

BACKGROUND OF THE INVENTION

The present invention relates to an optical disk recording system which forms a visible image on a disk surface of an optical disk, such as a CR-R/RW, a DVD+R/RW, or a DVD-R/RW, by use of a laser.

Recording a visible image, such as characters or graphics, on a recording surface of an optical disk or a label surface (a surface opposite the recording surface) of the same by use of a laser has been known.

For instance, Patent Document 1 proposes a technique of providing a visible light characteristic changing layer at a position which is viewable from a label surface side of an optical disk; and exposing the visible light characteristic changing layer to a laser beam to thus change a visible light characteristic of the layer and render a visible image.

Patent Document 2 proposes a technique of using a reversible phase change material for a recording film of an optical disk, which enables recording of a visible image by use of a laser, and rewriting recorded graphics.

Patent Document 3 proposes a technique of newly writing a visible image on a recording surface of an optical disk on which a visible image has already been recorded.

Patent Document 4 proposes a visible image recorder capable of preventing occurrence of a failure of adjacent pixels in a visible image to be recorded at separated positions to thus record a visible image, differing from the original image, which would otherwise be caused when the visible image has been brought out of focus by a servo during recording of a visible image.

Patent Document 4 also describes, as a way to determine an angle position θ, a technique of determining a single rotation from a predetermined number of cycles; generating a pulse signal every predetermined number of cycles; and determining an angle position by means of the number of pulses (FIG. 6).

Patent Document 1: JP-A-2002-203321
Patent Document 2: JP-A-2003-016649
Patent Document 3: JP-A-2004-039019
Patent Document 4: JP-A-2004-030832

The invention described in Patent Document 4 describes out-of-focus but provides no description about "buffer under run."

"Buffer under run" is an interruption of recording which can arise irrespective of focus control. An interruption of recording attributable to out-of-focus and an interruption of recording attributable to "buffer under run" are totally different from each other in terms of the amount of data which remain in a buffer of an optical disk drive unit at the time of occurrence of the interruption. As above, "buffer under run" is a phenomenon which cannot be predicted from out-of-focus, and hence out-of-focus and "buffer under run" cannot be discussed in the same terms.

SUMMARY OF THE INVENTION

Accordingly, the present invention aims at providing an optical disk recording system which enables visually-smooth rendering even when rendering has been interrupted as a result of occurrence of "buffer under run" or when occurrence of "buffer under run" is predicted.

In order to achieve the above object, the present invention is characterized by having the following arrangements.

(1) An optical disk recording system comprising:
an optical disk;
an optical disk drive unit that includes a buffer storage portion that temporarily stores data to be transferred from a host device, and a rotating portion that holds and rotates the optical disk and outputs an angle position signal, the optical disk drive unit recording on the optical disk a visible image corresponding to the data; and
the host device that is provided for transferring the data to the optical disk drive unit,
wherein the optical disk drive unit interrupts recording operation when an error of data emptiness in the buffer storage portion occurs in the course of recording during a predetermined revolution of the optical disk,
the host device resumes transfer of data after discarding data corresponding to a section between a position where the error occurs and a reference angle position on the optical disk, and
the optical disk drive unit resumes receipt of data, to resume recording operation from the reference angle position.

(2) An optical disk recording system comprising:
an optical disk;
an optical disk drive unit that includes,
a buffer storage portion that temporarily stores data to be transferred from a host device,
a rotating portion which holds and rotates the optical disk and outputs an angle position signal,
a signal processing portion which reads, from the buffer storage portion, data corresponding to a predetermined number of sectors during one revolution of the optical disk and which processes the read data, and
a light-emitting portion that emits a laser beam at power responsive to the data processed by the signal processing portion to record the data on the optical disk; and
the host device that transfers the data to the optical disk drive unit, and includes a count portion that counts the number of sectors of the data transferred to the optical disk drive unit,
wherein the optical disk drive unit temporarily interrupts receipt of data from the host device when an error of data emptiness in the buffer storage portion occurs in the course of recording during a predetermined revolution of the optical disk, and sends a report to the effect to the host device and interrupts recording of data to the optical disk,
wherein the host device specifies data corresponding to a section between a position where the error occurs and a start position of the next revolution, based on the number of sectors counted by the count portion when the error of data emptiness occurs in the optical disk drive unit and the predetermined number of the sectors, and resumes transfer of data after discarding the specified data, and
wherein the optical disk drive unit resumes receipt of data to resume recording operation from the start position of the next revolution.

(3) An optical disk recording system comprising:
an optical disk;
an optical disk drive unit that includes
a buffer storage portion that temporarily stores data to be transferred from a host device,
a rotating portion that holds and rotates the optical disk and outputs an angle position signal,
a signal processing portion that reads, from the buffer storage portion, data corresponding to M×N sectors (N, M denotes natural numbers) during one revolution of the optical disk and processes the read data, and a light-emitting portion that emits a laser beam at power responsive to the data processed by the signal processing portion to record data on the optical disk; and the host device transfers to the optical disk drive unit the data corresponding to N sectors by one transfer operation, and includes a count portion that counts the number of operations for transferring data to the optical disk drive unit, wherein the optical disk drive unit temporarily interrupts receipt of data from the host device when an error of data emptiness in the buffer storage portion occurs in the course of recording during a predetermined revolution of the optical disk, and sends a report to the effect to the host device and interrupts recording of data to the optical disk, wherein the host device specifies the data corresponding to a section between a position where the error occurs and a start position of the next revolution, based on the number of transfer operations counted by the count portion when the error of data emptiness occurs in the optical disk drive unit and the number M, and resumes transfer of data after discarding the specified data, and wherein the optical disk drive unit resumes receipt of data, to resume recording operation from the start of the next revolution.

(4) An optical disk recording system comprising:
an optical disk;
an optical disk drive unit that includes
a buffer storage portion that temporarily stores data to be transferred from a host device,
a rotating portion that holds and rotates the optical disk and outputs an angle position signal,
a signal processing portion that reads, from the buffer storage portion, data corresponding to a predetermined number of sectors during one revolution of the optical disk and processes the read data,
a light-emitting portion that emits a laser beam at power responsive to the data processed by the signal processing portion to record data on the optical disk, and
a monitoring portion for predicting occurrence of an error of data emptiness stored in the buffer storage portion; and the host device for transferring the data to the optical disk drive unit, wherein, during the course of recording for a predetermined revolution of the optical disk, the optical disk drive unit reports an anomaly to the host device when the monitoring portion predicts occurrence of an error of data emptiness in the buffer storage portion; temporarily interrupts receipt of the data from the host device; interrupts recording of the data on the optical disk after occurrence of an error of data emptiness in the buffer storage portion; subsequently resumes receipt of data from the host device; and resumes recording operation from a start position of the next revolution.

(5) The optical disk recording system according to ( ), wherein the monitoring portion includes a detection portion that detects a volume of data stored in the buffer storage portion and a volume of data output from the buffer storage portion, and predicts occurrence of an error of data emptiness in the buffer storage portion based on the volume of stored data, the volume of output data, and the predetermined number of the sectors.

(6) The optical disk recording system according to (5), wherein, when a remainder obtained by dividing a total sum of the volume of stored data and the volume of output data by the predetermined number is zero and the volume of stored data is equal to or less than the volume of data corresponding to the predetermined number of sectors, the monitoring portion predicts occurrence of an error of data emptiness in the buffer storage portion.

(7) An optical disk recording system comprising:
an optical disk;
an optical disk drive unit that includes
a buffer storage portion that temporarily stores data to be transferred from a host device,
a rotating portion that holds and rotates the optical disk and outputs M (M denotes a natural number) angle position signals per revolution,
a signal processing portion that reads, from the buffer storage portion, data corresponding to M×N sectors (N denotes a natural number) during one revolution of the optical disk and processes the read data, and
a light-emitting portion that emits a laser beam at power responsive to the data processed by the signal processing portion, to record the data on the optical disk; and the host device that transfers the data to the optical disk drive unit, and includes a count portion that counts the number of sectors of data transferred to the optical disk drive unit, wherein the optical disk drive unit temporarily interrupts receipt of data from the host device when an error of data emptiness in the buffer storage portion occurs in the course of recording during a predetermined revolution of the optical disk, and sends a report to the effect to the host device and interrupts recording of the data to the optical disk, wherein the host device specifies the data corresponding to a section between a position where the error occurs and a position specified by the angle position signal, based on the number N and the number of sectors counted by the count portion when the error of depletion of data occurs in the optical disk drive unit, and resumes transfer of the data after discarding the specified data, and wherein the optical disk drive unit resumes receipt of data to resume recording operation according to the angle position signal.

(8) An optical disk recording system comprising:
an optical disk;
an optical disk drive unit that includes
a buffer storage portion that temporarily stores data to be transferred from a host device,
a rotating portion that holds and rotates the optical disk and outputs N×M (N, M denote natural numbers) angle position signals per revolution,
a signal processing portion that reads, from the buffer storage portion, data corresponding to N×M sectors during one revolution of the optical disk and processes the read data, and
a light-emitting portion that emits a laser beam at power responsive to the data processed by the signal processing portion to record data on the optical disk; and the host device that transfers the data to the optical disk drive unit, and includes a count portion that counts the number of sectors of the data transferred to the optical disk drive unit, wherein the optical disk drive unit temporarily interrupts receipt of data from the host device when an error of data emptiness in the buffer storage portion occurs in the course of recording during a predetermined revolution of the optical disk, and sends a report to the effect to the host device and interrupts recording of data to the optical disk, wherein the host device specifies data corresponding to a duration between a location where an error occurs and the angle position signal, from the number of sectors counted by the count portion when the error of data emptiness occurs in the optical disk drive unit, and resumes transfer of data after having discarded the specified data, and wherein the optical disk drive unit resumes receipt of data, to thus resume recording operation from the start of the next revolution in accordance with the angle position signal.

(9) Method of controlling an optical disk recording system that comprises an optical disk drive unit including a buffer storage portion that temporarily stores data to be transferred from a host device and a rotating portion that holds and rotates an optical disk and outputs an angle position signal, the optical disk drive unit recording on an optical disk a visible image based on data, and the host device for transmitting the data to the optical disk drive unit, the method comprising:

transferring the data from the host device to the optical disk drive unit;

interrupting recording operation by the optical disk drive unit when an error of data emptiness in the buffer storage means occurs in the course of recording during a predetermined revolution of the optical disk;

resuming transfer of data by the host device after discarding data corresponding to a section between a position where the error occurs and the reference angle position on the optical disk; and resuming receipt of data by the optical disk drive unit, to resume recording operation from the reference angle position.

(10) An optical disk drive unit for receiving data transferred from a host device and recording on an optical disk a visible image corresponding to the data, the optical disk drive unit comprising:

a buffer storage portion that temporarily stores data to be transferred from the host device;

a rotating portion that holds and rotates the optical disk and outputs an angle position signal, wherein recording operation is interrupted when an error of data emptiness in the buffer storage portion occurs in the course of recording during a predetermined revolution of the optical disk, and wherein the buffer storage portion resumes storing data, transferred from the host device, in which data corresponding to a section between a position where the error occurs and the reference angle position on the optical disk is discarded, to resume recording operation from the reference angle position.

According to such an optical recording system of the present invention, even when rendering is interrupted as a result of "buffer under run" having arisen because of delayed transfer of image data from host device or even when occurrence of "buffer under run" error is predicted, an angle on a disk where an interruption has arisen is computed, and the host device resumes rendering by means of transferring spliceable rendering data in consideration of the thus-computed angle, to thus make an accurate rendering splice.

Even when the processing speed of the host device is not sufficient, visually-smooth rendering is enabled.

BRIEF DESCRIPTION OF THE DRAWINGS

FIGS. 3A to 3H are views for describing operation of a buffer 24;

FIG. 4 is a view showing the configuration of a status register provided in a drive 10;

FIG. 6 is a status transition view for describing operation of the drive 10.

DETAILED DESCRIPTION OF PREFERRED EMBODIMENTS

Figure 1:
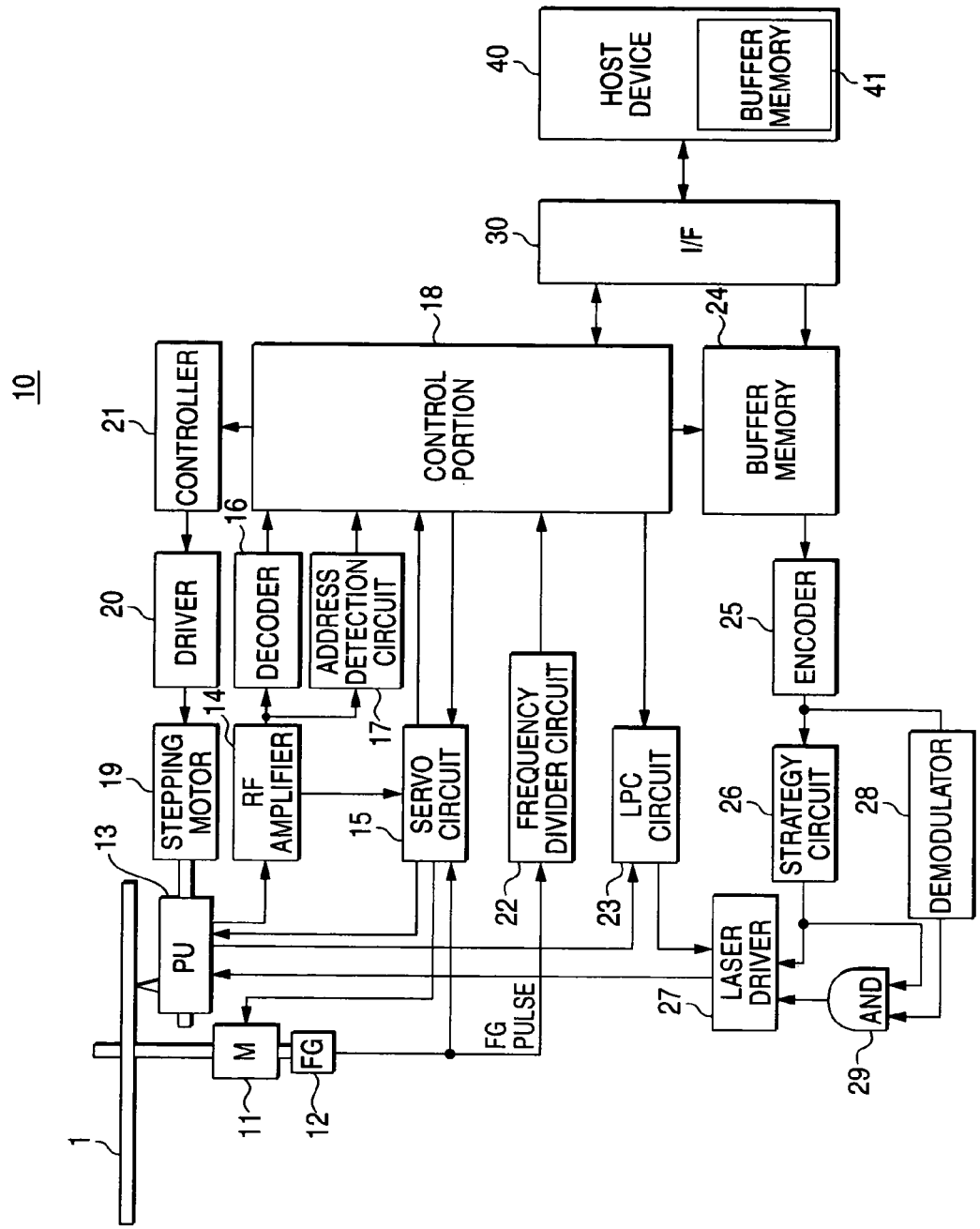
FIG. 1 is a block diagram showing the configuration of a principal portion of an embodiment of an optical disk recording system according to the present invention.

FIG. 1 is a block diagram showing the principal configuration of an embodiment of an optical disk recording system of the present invention.

The optical disk recording system of the present embodiment comprises an optical disk drive unit 10 which records and reproduces data to and from an optical disk 1 and forms a visible image; and host device 40, such as a host computer, a backend device, or the like, connected to the optical disk drive unit 10. The host device 40 is equipped with an image editing program for editing a visible image to be recorded on the optical disk 1, and a control program for recording data and a visible image on the optical disk 1 and reproducing data from the optical disk 1. Reference numeral 41 designates buffer memory for temporarily storing data to be transferred from the host device 40 to the optical disk drive unit 10. The host device 40 sequentially reads the data stored in the buffer memory 41 and transfers the thus-read data to buffer memory 24 of the optical disk drive unit 10. The function of the host device 40 may be imparted to the optical disk drive unit 10.

The optical disk drive unit 10 comprises a spindle motor 11 for rotationally driving the optical disk 1; a frequency generator 12 for outputting an FG pulse of a frequency responsive to the rotational speed of the spindle; an optical pickup 13; an RF amplifier 14; a servo circuit 15; a decoder 16; an address detection circuit 17; a control portion 18; a stepping motor 19; a motor driver 20; a motor controller 21; a frequency divider circuit 22; an LPC (Laser Power Control) circuit 23 for controlling laser power; the buffer memory 24; an encoder 25; a strategy circuit 26; a laser driver 27 for driving a laser diode of the optical pickup 13; a demodulator circuit 28 and an AND circuit 29 which are used for recording a visible image; and an interface circuit 30 for exchanging data among the control portion 18, the buffer memory 24, and the host device 40.

The optical pickup 13 radiates a laser beam onto the optical disk 1 to thus record and reproduce data as well as to render a visible image. A returned-light reception signal (an RF signal having undergone EFM modulation or 8-to-16 modulation), which is generated upon receipt of the light returned at the time of the laser beam having been radiated onto the optical disk 1, is amplified by the RF amplifier 14. The thus-amplified signal is supplied to the servo circuit 15, the decoder 16, and the address detection circuit 17.

On the basis of the signal output from the RF amplifier 14 and the control signal output from the control portion 18, the servo circuit 15 controls the rotation of the spindle motor 11 and controls the focus and tracking of the optical pickup 13.

The decoder 16 demodulates the signal that is supplied from the RF amplifier 14 and has undergone EFM modulation or 8-to-16 modulation, and outputs reproduced data.

The address detection circuit 17 extracts a wobble signal component from the signal supplied from the RF amplifier 14; demodulates an ADIP (Address In Pre-Groove) of DVD-based specifications or an ATIP (Absolute Time in Pre-Groove) of CD-based specifications; and detects address information (a positional address).

The stepping motor 19 is a motor for actuating (feeding) the optical pickup 13 in a radial direction of the optical disk 1.

The motor driver 20 rotationally drives the stepping motor 19 in accordance with the control signal supplied from the motor controller 21. Pursuant to an actuation start command, including the actuating direction and the distance of actuation of the optical pickup 13 in the radial direction, issued by the control portion 18, the motor controller 21 generates a pulse signal responsive to the distance of actuation and the actuating direction, and supplies the thus-generated signal to the motor driver 20.

The buffer memory 24 is buffer memory, which is formed from FIFO (First In First Out) memory, for recording data (recording data)—which are supplied from the host device 40 by way of the interface circuit 30 and are to be recorded onto the optical disk 1—and data pertaining to a visible image to be rendered on the optical disk.

When the recording data are recorded on the optical disk 1, the encoder 25 subjects the recording data read from the buffer memory 24 to EFM modulation or 8-to-16 modulation; and outputs the thus-modulated data to the strategy circuit 26. The strategy circuit 26 subjects the signal supplied from the encoder 25 to time-axis correction processing, or the like; and outputs the thus-processed signal to the laser driver 27. The laser driver 27 drives the laser diode of the optical pickup 13 in accordance with the modulated signal supplied from the strategy circuit 26 and control of the LPC circuit 23.

Operation performed when a visible image is recorded on the optical disk 1 and operation performed at the time of occurrence of "buffer under run" will now be described in detail.

1. Recording Method

An image or characters are rendered on a data recording surface or a label surface of the optical disk 1 loaded in the optical disk drive unit (hereinafter simply called a "drive") 10 while data are being transferred from the host device (a computer, a back-end device, or the like) 40 to the drive 10.

At this time, the spindle motor 11 of the drive 10 is rotated at a given rotational velocity (CAV: Constant Angular Velocity), and a focus actuator servos the recording surface or the label surface in the same manner as does a focus servo system of an ordinary optical disk. The tracking actuator is made free without being servoed, or a periodic (a sinusoidal wave, a triangular wave, or the like) electric current is caused to flow into the tracking actuator, thereby swinging the actuator. Feeding is gradually performed from an inner radius to an outer radius, or vice versa.

RAW mode encoding operation of an ordinary CD-R/RW is taken for encoding operation to be performed in the drive 10. However, encoding of a TAO (track at once) mode is also allowable. In relation to the laser, as in the case of ordinary CD-R/RW recording operation, the power of the laser is switched between high and low by means of a pulse signal originating from an EFM signal generated by the encoder (CD encoder) 25. Write power required herein is higher than or equal to a certain power level at which visual traces are left on the recording surface or the label surface of the optical disk 1. By means of this power, a doughnut-shaped trace can be left on the optical disk 1.

2. Rendering Method

As illustrated, the demodulator 28 for detecting a certain EFM pattern is provided in a stage subsequent to the encoder 25 of the drive 10. The demodulator 28 is set so as to output a HIGH value upon detection of a certain specific EFM pattern and output a LOW value at other times. The AND circuit 29 subjects to AND operation an output from the demodulator 28 and the pulse signal to be input to the laser, and delivers an AND result to the laser driver 27.

As a result, a laser beam of write power and a laser beam of read power are alternately emitted only in a certain specific EFM pattern, in accordance with the EFM signal, whereby recording traces are left on the optical disk 1. At other EFM patterns, a laser beam of read power is always emitted, and no recording traces are left on the optical disk 1. The EFM pattern is originally generated from the data transferred from the host device 40. Hence, a visible image, such as images or characters, can be rendered on the optical disk 1 by means of transmitting, from the host device 40, data corresponding to images or characters to be rendered.

3. Spindle Motor

In order to realize a smooth rendering splice after occurrence of "buffer under run," the angle position of the spindle must be detected. In order to detect the angle position of the spindle, the frequency generator 12, which employs counter electromotive force of a hall sensor or a spindle coil, is used. In the present embodiment, the frequency generator 12 is arranged to generate pulses of exactly S cycles (FG pulses) per rotation of the spindle motor (S: an integer, S>0). Consequently, a pulse duration of each of the pulses of S cycles assumes the following value.

Length of a circular arc$[m]$=$2\pi$×radial position$[m]$/S [cycle value]

However, in reality, the value is not obtained as defined by the above equation, because of errors in mounting of the hall sensor, electrical variations in a circuit, or the like, and a resultant value usually tends to vary. For this reason, the frequency divider circuit 22 subjects the FG pulses generated by the frequency generator 12 to frequency division at an appropriate frequency division ratio by means of hardware or software, so that a highly-accurate pulse of an S' cycle per revolution can be obtained (S': an integer, S'>0). An appropriate frequency division ratio varies in accordance with the type or structure of a motor. However, there usually exists a frequency division ratio at which an accurate pulse of one cycle can be generated at least in one revolution.

Under another angle position detection method, an object subject to detection, which is printed directly on the optical disk 1 or attached to the same, is detected by use of a detection element, to thus enable detection of an accurate angle position.

4. Detection of Reference Angle Position

One radial direction is previously set on the optical disk 1 as a reference angle position thereof. A predetermined mark, which is used for representing the reference angle position, is provided on the front surface or reflection layer of the optical disk 1. The predetermined mark is a sub-code or header showing a specific time position, an ATIP or ADIP showing a specific address, a barcode or another mark formed by means of visible image formation processing on or printed on the front surface or reflection layer of an optical disk, or any mark which can be read by use of optical means such as the optical pickup 13.

The control portion 18 of the drive 10 detects a mark, which shows the reference angle position, from an output from the address detection circuit 17 or an output from the decoder 16, to thus acquire a count of a pulse signal (S' pulse) generated at S' cycles per revolution at a point in time when the mark has been detected; and saves the thus-acquired count. When the count of the S' pulse has become equal to the saved count, the optical pickup 13 is understood to remain in contact with the reference angle position on the optical disk.

When the disk is first subjected to rendering or rendering splicing (a visible image is written once), rendering is initiated in synchronism with this reference angle position. Thereby, rendering and recording can be started every time from the same angle position (the reference angle position) on the disk, regardless of the number of times rendering is performed.

5. Transfer of Data from the Host Device 40 to the Drive 10

A WRITE command, or the like, of ATAPI (AT Attachment Packet Interface) is used for transfer of data from the host device 40 to the drive 10. Encoding of data performed in the drive 10 will be described hereunder as RAW mode encoding of a common CD-R/RW. However, encoding of data may also be performed in a TAO mode without involving a problem.

In the case of the RAW mode, the number of bytes of one sector of data transferred from the host device 40 to the drive 10 is 2448 bytes. 98 EFM frames are present in one sector, and 24 bytes of main data are present in one EFM frame. Further, 96 bytes of sub-codes are present in one sector. Therefore, we have $$98[\text{frames}] \times 24[\text{bytes}] + 96[\text{bytes}] = 2448[\text{bytes}].$$

In the case of the TAO mode, the 96 bytes of sub-codes are unnecessary, and hence we have 2352 bytes.

The unit at which data are transferred in accordance with the WRITE command, or the like, corresponds to several sectors. Provided that the number of sectors required for one transfer of data is taken as N and the number of bytes required for one transfer of data is taken as M, M is defined as $$M[\text{bytes}] = 2448[\text{bytes}] \times N[\text{sectors}].$$

6. Number of Sectors in One Revolution of the Disk

An encode frequency (an n-fold CD encoding speed) (hereinafter called an "n×CD encoding speed") and a spindle rotational velocity, by means of which data exactly corresponding to an integral number of data transfer operations are encoded during one revolution of the disk, are set in advance for the drive 10.

For instance, in an example case where rendering is performed over a revolution of an optical disk when a single transfer of data corresponding to 15 sectors has been performed exactly six times, n× encoding speed of the drive 10: 45× speed of a CD, and the rotational velocity of the spindle: 2250 rpm are set. The reason for this is as follows:

Encoding operation of the CD encoder is set so as to process 75 sectors per second at a standard speed (called 1× speed). When the rotational speed is converted into the number of bytes, data are processed at a rate of $$75 \times 2448 = 183600[\text{bytes/sec.}] \quad (6\text{-}1)$$

per second. On the assumption that data are encoded at 45× speed, the number of bytes processed per second is 45 times the solution of Equation (6-1), and hence we have $$45 \times 183600 = 8262000[\text{byte/sec.}] \quad (6\text{-}2).$$

In contrast, transfer of data from the host device 40 during a single revolution of the disk is achieved when transfer of data corresponding to 15 sectors has been performed six times. Hence, the number of bytes for one revolution of disk is determined as $$2448 \times 15 \times 6 = 220320[\text{bytes/revolution}] \quad (6\text{-}3).$$

From Equations (6-2) and (6-3), we have $$8262000/220320 = 37.5[\text{revolution/sec.}].$$

In other words, we have the following rotational velocity:

$$37.5 \times 60 = 2250[\text{rpm}]$$

As above, when transfer of data corresponding to 15 sectors is performed six times per revolution of the disk, 45×CD encoding speed and a rotational velocity of 2250 [rpm] for the spindle are understood to be an example setting for firmware. Now, attention must be paid to the requirement that all the numerals provided above must be combinations of numerals which can be implemented by hardware. For instance, when the n×CD transfer speed is set so as to assume an irrational number, implementing the setting is nearly impossible, in view of hardware.

Given that the number of times data are required to be transferred from the host device 40 in order to record data corresponding to a revolution of the disk is taken as X, the number of sectors L per revolution of the disk is determined as $$L[\text{sectors}] = X[\text{times}] \times N[\text{sectors}].$$

7. Rendering from the Reference Angle Position

Encoding (rendering and recording) is commenced from the reference angle position on the disk. Specifically, when the number of counts of the S' pulse has become equal to the count of the S' pulse that has been measured and saved in "4. Detection of the reference angle position" and corresponds to the reference angle position on the optical disk, the encoder 25 is caused to initiate encoding of the image data for that revolution. Use of this method enables commencement of rendering and recording from the same angle position (the reference angle position) on the disk every time, regardless of the number of times rendering is performed.

In the present invention, the host device 40 is provided with a sector counter. This counter increments by one every time data corresponding to one sector are transferred to the drive 10 on condition that the sector, from which rendering or re-rendering is commenced, is taken as 0. The count of this counter is taken as T.

When the optical disk on which a visible image is recorded is taken out of the drive and the disk is not again inserted into the drive and recorded; namely, when a visible image is recorded only once on the optical disk, the reference angle position on the optical disk, which has been detected as mentioned above, does not need to be used. In this case, the essential requirement is to start encoding at a timing corresponding to the reference angle position by means of taking a position, at which an FG pulse or the S' pulse output from the frequency generator 12 in "3. Spindle motor" arises, as a reference angle position without detecting the reference angle position mentioned in connection with "4. Detection of the reference angle position."

8. Buffer Under Run

When the speed at which data are transferred from the host device 40 is slower than the speed at which data are written from the drive 10 to the optical disk 1 (i.e., the encoding speed), or when, for some reason, transfer of data from the host device 40 to the drive 10 is interrupted for at least a certain period of time, data in the buffer memory 24, which are to be written into the optical disk 1, become depleted, whereupon rendering and recording operations are interrupted. This phenomenon is called "buffer under run."

In the present invention, when "buffer under run" occurs during recording of a visible image or when occurrence of "buffer under run" is predicted, rendering can be made visually smooth as follows:

9. Rendering Splicing after "Buffer Under Run"

When rendering is interrupted as a result of occurrence of "buffer under run," the drive 10 suspends feeding action at that position where rendering has been interrupted or records the feed position in memory and actuates the optical pickup 13 to that position when rendering is spliced. Further, the spindle is left rotating while the rotational speed of the spindle is maintained.

When rendering has been interrupted, the host device 40 divides the T sectors (the number of transferred sectors) by the L sectors (the number of sectors in one revolution of a disk), to thus determine a remainder Z.

$$Z[\text{sectors}]=\text{mod}\{T[\text{sectors}]/L[\text{sectors}]\}$$

where mod $\{x/y\}$ represents a remainder obtained when "x" is divided by "y."

Descriptions are hereinbelow provided for the case where the remainder Z is zero and for the case where the remainder Z is not zero.

9-1. When the Remainder Z is Zero

In this case, rendering has been interrupted immediately before the reference angle position. Consequently, rendering can be spliced from the reference angle position without interruption, so long as the host device 40 transfers the data without modifications to the drive 10 to thus resume rendering. Simultaneously with resumption of rendering, feeding is also performed from the inner radius to the outer radius, or vice versa.

9-2. When the Remainder Z is not Zero

In this case, the remainder Z represents the number of sectors excessively rendered with respect to the reference angle position. Consequently, the number of sectors R, which are deficient in recording before the reference angle position, is obtained as follows:

$$R[\text{sectors}]=L[\text{sectors}]-Z[\text{sectors}]$$

The host device 40 discards data corresponding to the head R sector of the next data to be transferred from the buffer 41, and transfers to the drive 10 data subsequent to the thus-discarded data. By means of this, when the drive 10 has again resumed rendering, only a portion of data is lost, but rendering of a graphical pattern can be spliced without interruption from the reference angle position. Simultaneously with resumption of rendering, feeding is also gradually performed from the inner-radius to the outer radius, or the vice versa.

There is a concern of rendering becoming thin by the amount corresponding to the data discarded by the host device 40. However, in reality, rendering becomes thin to such an extent that thinning is not visually discerned.

In light of 9-1 and 9-2, operations are generalized as follows. When "buffer under run" occurs, the host device 40 determines the number of sectors R which are deficient in recording before the reference angle position. Next, data corresponding to the head R sector of the next data to be transferred are discarded (data are not discarded in the case of R=0), and data subsequent to the discarded data are transferred to the drive 10.

10. Calculation of the Number of Transfer Operations

Although the number of all sectors has been handled as units in 9, the same advantage is yielded even when the number of transferring operations is computed. The host device 40 is provided with a transfer operation counter which increments by one every time data are transferred from the buffer 41 to the drive 10, and a count value of the counter is taken as D. When rendering has been interrupted by "buffer under run," the host device 40 divides the number of transferring operations D (the total number of transfer operations) by X (the number of transfer operations performed per one revolution of the disk), to thus determine a remainder Q.

$$Q[\text{times}]=\text{mod}\{D[\text{times}]/X[\text{times}]\}$$

The number of transfer operations V, which are deficient in recording before the reference angle position, is determined as $$V[\text{times}]=X[\text{times}]-Q[\text{times}].$$

Therefore, when "buffer under run" occurs, the host device 40 determines V; discards data, which will be transferred through operations which are data of V times transfer of the head sector of the next data to be transferred from the buffer 41 (the data are not discarded in the case where V=0); and transfers to the drive 10 data subsequent to the thus-discarded data.

Figure 2A:
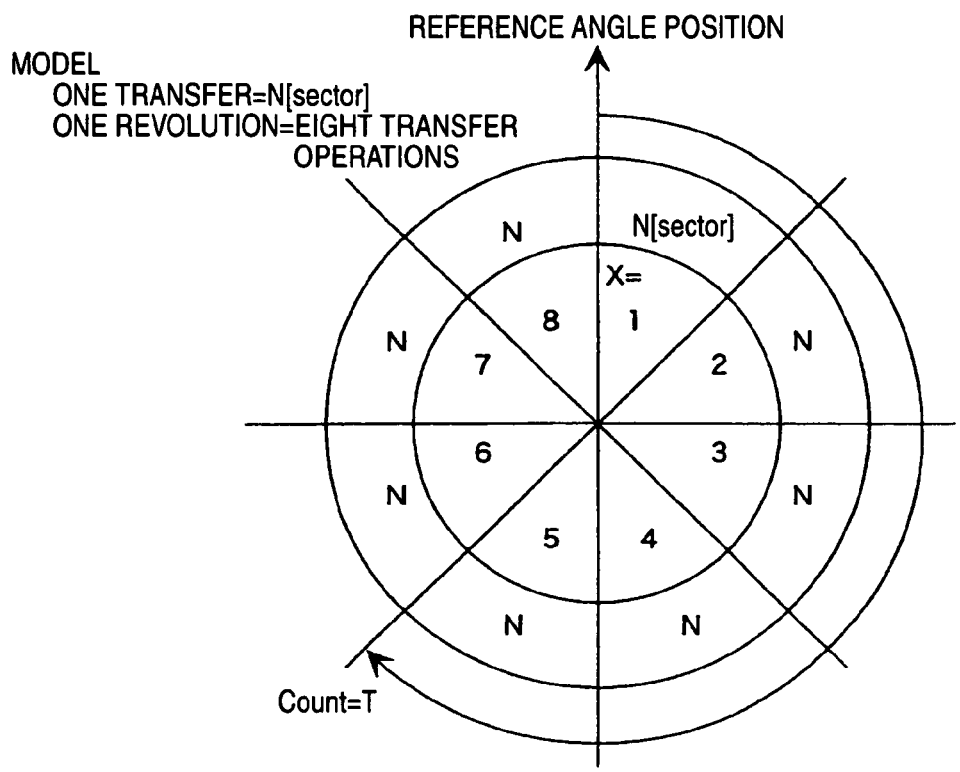
FIGS. 2A and 2B are views for describing processing performed in the event of occurrence of "buffer under run"
Figure 2B:
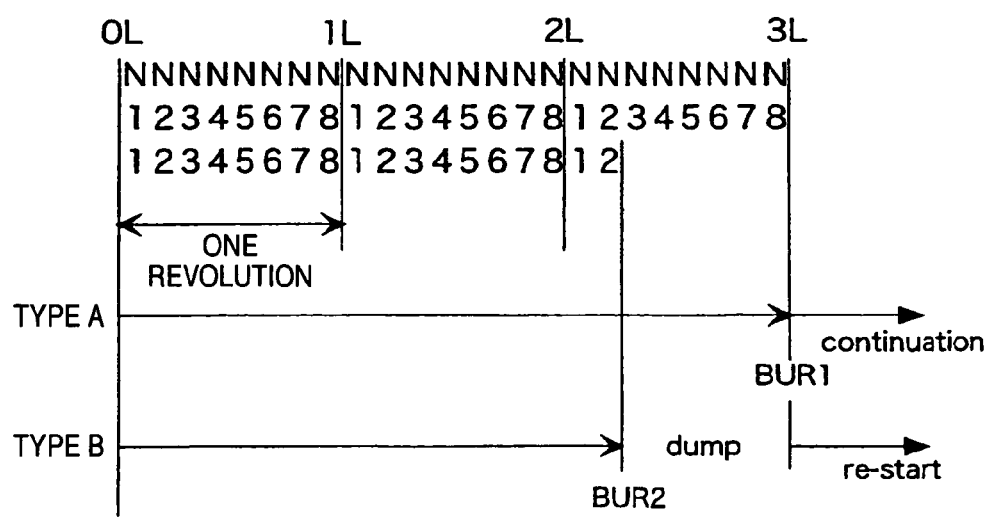

Specific descriptions will be provided by reference to FIGS. 2A and 2B.

As shown in FIG. 2A, this embodiment shows a case where data corresponding to N sectors are transferred from the host device 40 to the drive 10 per data transfer operation, and where data which is equal in quantity to one revolution are transferred by means of eight data transfer operations. At this time, the number of sectors L of one revolution is L=8N, and the number of transfer operations for one resolution is X=8.

"Type A" in FIG. 2B shows a case where recording is interrupted as a result of occurrence of first "buffer under run" (BUR1) when transfer of data—being equal in quantity to three revolutions—has just been completed.

At this time, a total number of transfer operations: D=3×X=24, and the number of remainder transfer operations: Q=mod(D/X)=mod(24/8)=0 is obtained. Discarding of data is not performed in the host device 40, and recording is continued from the reference angle position while the feeding position is being retained. In this case, there is no splice.

"Type B" in FIG. 2B shows a case where recording is interrupted as a result of occurrence of second "buffer under run" (BUR2) when data which is equal in quantity to two revolutions and two transfer operations have been transferred.

At this time, a total number of transfer operations: D=2X+2=18, the number of remainder transfer operations: Q=mod(D/X)=mod(18/8)=2, and the number of discarded transfer operations: V=x−Q=8−2=6 are obtained.

Consequently, the host device 40 discards data, which will be transferred by six transfer operations, while the feeding position is being maintained, and resumes recording from the reference angle position.

11. Splicing of Rendering without Discarding Data

The methods, which have been described thus far, involve discarding of data which are not visually discernible. In order to avoid discarding of data, rendering can be spliced without discarding data by use of a method described below.

The driver 10 is provided in advance with a sector counter for counting the number of sectors transferred from the buffer 24 to the optical disk 1 (i.e., the encoded sectors). This counter takes a sector, at which rendering or re-rendering is started, as zero and increments by one every time one sector is transferred to the optical disk 1. A count value of this counter is taken as B. When the WRITE command has been issued by the host device 40 and when the volume of data remaining in the buffer 24 is a "threshold value of buffer under run," a "buffer under run" error is returned. As in the case of foregoing 9, the "threshold value of buffer under run" is derived as follows:

[Threshold value of buffer under run]=$L$[sectors]–mod $\{B$[sectors]$/L$[sectors]$\}$ The threshold value must be determined every time B is incremented.

As a result, when the host device 40 has requested data transfer by means of the WRITE command, the driver 10 returns a "buffer under run" error, to thus prevent receipt of rendering data from the host device 40. Thereupon, the host device 40 detects the "buffer under run" error of the drive 10 to thereby suspend transfer of data. Subsequently, at the time of re-start of rendering, the host device 40 transmits data from the reference angle position. Further, the drive 10 also starts rendering from the reference angle position. Accordingly, rendering can be spliced without discarding data.

12. Splicing of Rendering without Discarding Data (Calculating the Number of Transfer Operations)

By a combination of 10 and 11, rendering can also be spliced by means of calculating the number of transfer operations without discarding data.

The drive 10 is provided beforehand with a counter for counting the number of times data are transferred from the host device 40. A count value of this counter is taken as Y. In this case, the "threshold value of buffer under run" is obtained as follows:

"Threshold value of buffer under run"=$X$–mod $\{Y/X\}$

This must be determined every time Y is incremented.

This method is based on the premise that "buffer under run" does not occur during transfer of rendering data. Since "buffer under run" usually occurs when a time duration between one transfer operation and the next transfer operation becomes longer, this method does not pose any substantial problem.

The "threshold value of buffer under run" is described in detail by reference to FIGS. 3A to 3H.

The buffer (FIFO) 24 provided in the drive 10 is assumed to be represented as FIG. 3A.

In this drawing, data flow from up to down. Further, the quantity of data transferred in one operation is assumed to correspond to the volume of data shown in FIG. 3B. As shown in FIG. 3C, the buffer 24 can retain exactly the volume of data which will be transferred by eight operations.

FIG. 3D shows that the buffer 24 is EMPTY.

FIG. 3E shows that the buffer 24 is FULL.

The data transferred from the host device 40 are input to the buffer from above in the drawing. Data used for rendering are output to the disk 1 from below in the drawing, and the thus-output data are input to the encoder 25.

Usually, the data that have been received at the beginning are not output from the buffer 24. Therefore, data are stored in the buffer 24 as a result of the data being transferred from and input by the host device 40. When the buffer has become FULL, the data are output from the buffer 24 for the first time, and recording of data on the optical disk 1 is started.

During ordinary recording operation, recording is performed while the volume of data remaining in the buffer varies between 1 and 8.

When the buffer 24 has become EMPTY, recording is interrupted by the "buffer under run" error.

When the buffer 24 has become FULL, a BSY bit of a status register, which will be described later, is left as "1," thereby suspending receipt of data from the host device 40. When a space, which corresponds to the volume of data transferred in one operation, is generated in the buffer 24, BSY is assigned 0, thereby receiving data from the host device 40.

For instance, the number of data transfer operations required for one revolution of the disk is assumed to be three.

The drive 10 has a counter for counting the number of times data are transferred from the buffer 24 to the optical disk 1. By means of a remainder obtained by dividing the count value by three, the threshold value of buffer under run is sequentially changed as follows:

When a remainder, which is obtained by means of dividing by three the number of times data are transferred from the buffer to the disk, is zero, the threshold value of buffer under run=the volume of data corresponding to three transfer operations (FIG. 3F). When the remainder is one, the threshold value of buffer under run=the volume of data corresponding to two transfer operations (FIG. 3G). When the remainder is two, the threshold value of buffer under run=the volume of data corresponding to one transfer operations (FIG. 3H).

A remainder, which is obtained by means of dividing by three the number of times data are transferred from the buffer to the disk, represents the data rendered on the disk after the reference angle position. Therefore, the threshold value of "buffer under run" is determined such that the rendered data become equal in volume to one revolution of the disk in conjunction with the data still remaining in the buffer.

As in the case of 12, the drive 10 may be provided with a counter for counting the number of times Y data are transferred from the host device 40. A value, which is determined by subtracting from X a remainder—being obtained by dividing the count value Y by the number of data transfer operations X in one revolution—may be taken as the threshold value of "buffer under run."

Thus, when the host device 40 attempts to transfer data in the states shown in FIGS. 3F, 3G, and 3H, the drive 10 returns the "buffer under run" error, to thus halt receipt of data. Upon receipt of the error from drive 10, the host device 40 suspends transmission of data (temporary suspension). Subsequently, the data still remaining in the buffer are sequentially recorded on the disk, and the buffer becomes empty, whereupon recording is interrupted.

As a result, when "buffer under run" occurs, recording is suspended, at all times, at a position immediately before the reference angle position on the disk.

Just as mentioned previously, the drive 10 receives the next data intact, and starts writing the data onto the disk when the buffer has become FULL. Since writing of data is started from the reference angle position at all times, rendering can be spliced smoothly without discarding data.

FIG. 4 is a view showing the configuration of a status register provided in the drive 10. This status register is one of ATA registers and an 8-bit register.

The host device 40 can read bits from this status register; ascertains the current status of the drive 10 by means of the thus-read bits; and controls transfer of data to the buffer 24 on the basis of the thus-ascertained current status.

Details of the status register are as shown in FIG. 4. The BSY (busy) bit, a DRQ (data request) bit, and an ERR (error) bit are especially utilized. Specifically, in order to suspend transmission of data from the host device 40, the BSY bit is utilized, and occurrence of "buffer under run" is reported to the host device 40 by use of the ERR bit.

Figure 5:
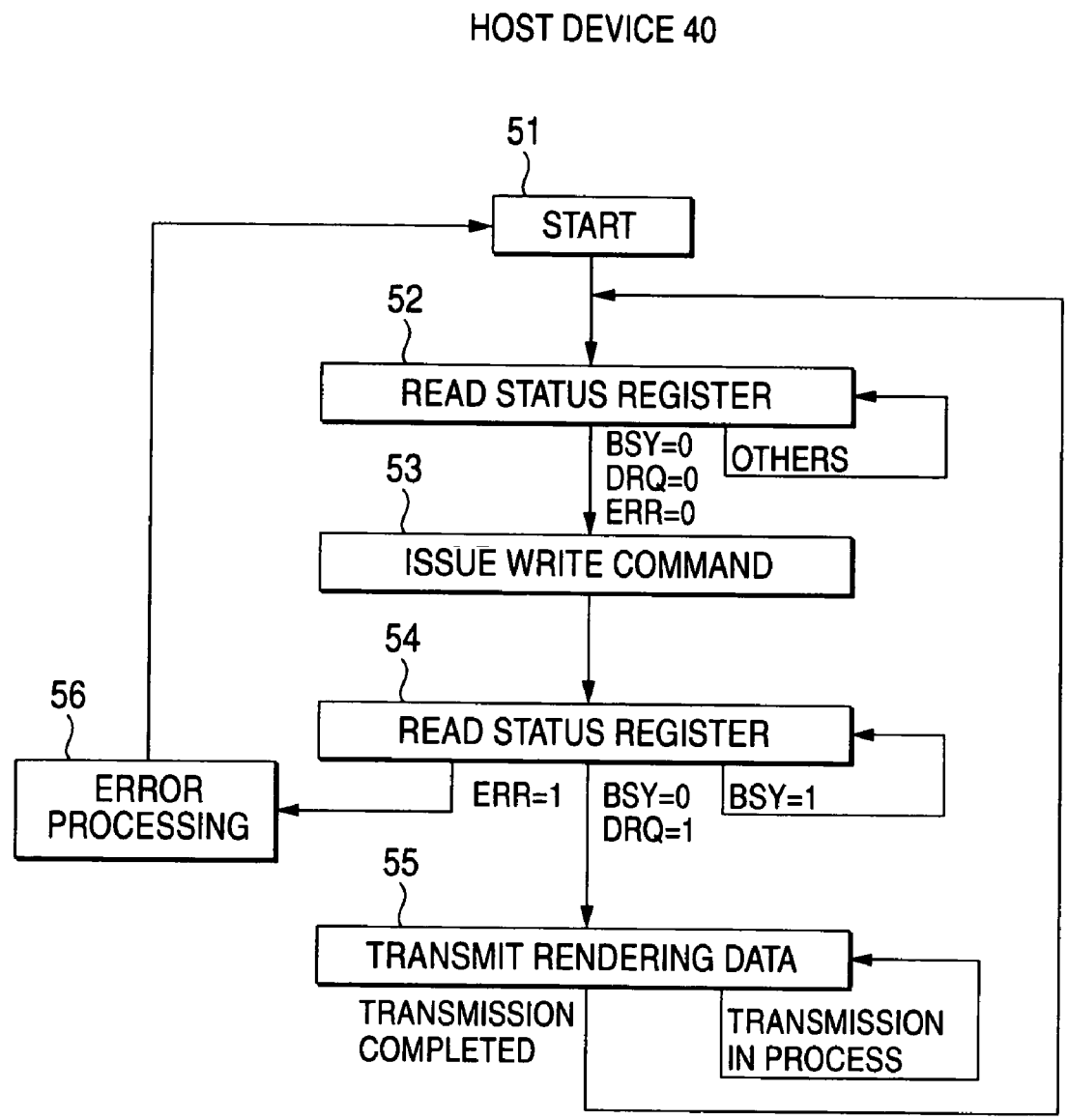
FIG. 5 is a status transition view for describing operation of host device 40.

FIG. 5 is a status transition chart for describing operation of the host device 40.

When processing is started (51), the host device 40 reads bits from the status register provided in the drive 10 (52). When the respective BSY, DRQ, and ERR bits are not zero, the host device waits until all the bits assume a value of 0. When all the BSY, DRQ, and ERR bits have assumed a value of 0, the WRITE command is issued to the drive 10 (53), and the bits are read from the status register (54). Consequently, when the BSY bit assumes a value of 1, the host device waits until the BSY bit assumes a value of 0, and the DRQ bit assumes a value of 1. When the BSY bit has assumed a value of 0 and the DRQ bit has assumed a value of 1, rendering data are transmitted to the buffer 24 of the drive 10. When transmission has been completed, processing returns to reading of bits from the status register (52).

In contrast, when the ERR bit read from the status register has assumed a value of "1," "buffer under run" is considered to occur, and error processing is performed (56). As mentioned previously, data are discarded, or elapse of a predetermined period of time is awaited.

FIG. 6 is a status transition chart for describing operation of the drive 10.

When processing is started (61), the drive 10 clears the error flag (referred error flag) provided in the drive 10 (62). The drive 10 then resets all the BSY, DRQ, and ERR bits of the status register to zero (63), and awaits a command from the host device 40 (64) Upon receiving the WRITE command from the host device 40, the drive 10 sets the BSY bit in the status register to a value of 1 (65), and checks the error flag (66). When the error flag is not set, the BSY bit of the status register is set to a value of 0, and the DRQ bit of the same is set to a value of "1" (67). The drive 10 then awaits receipt of rendering data from the host device 40 (68). Upon receipt of rendering data from the host device 40 (69), the drive 10 transfer the received data to the buffer 24 (70). When receipt of the rendering data has been completed, a rendering status is ascertained (71). When the rendering status is not achieved, the status of the buffer 24 is ascertained (72). Since the buffer 24 is first not FULL, the BSY bit is set to a value of 0 (73), and the drive 10 returns to the command await status (64). Upon receiving the WRITE command again, the drive 10 iterates the previously-described operations. When the buffer status has become FULL, rendering of a visible image to the optical disk 1 is started (74). Namely, the data stored in the buffer 24 are sequentially read, and the thus-read data are supplied to the encoder 25. Encoding is commenced. As mentioned above, the BSY bit is set to a value of 0 (73), and the drive 10 returns to awaiting the command (64).

Upon receipt of the WRITE command, the drive 10 operates in the same manner as mentioned previously. Since rendering has already been started by this time, rendering is understood to be in process by means of the rendering status ascertainment (71), and the status of the buffer 24 is ascertained (75). Even when an ordinary status where the volume of data is equal to or less than the "buffer under run" threshold value is achieved despite of the BSY bit being set to "0," the drive 10 returns to a status of awaiting a command (64) as in the previous case (73).

When the buffer is FULL, the drive 10 waits until the buffer goes out of the FULL status as a result of data being read by the encoder 25.

When the amount of data stored in the buffer is equal to or less than the "buffer under run" threshold value, the error flag is set (76); the BSY bit is set to "0" (73); and the drive 10 returns to a status of awaiting a command.

Upon receipt of the WRITE command from the host device 40 while the error flag is set, the error flag becomes set by means of an error flag check (66), whereupon the BSY bit of the status register is set to "0," and the ERR bit of the same is set to "1" (77). The drive 10 interrupts writing of data, to thus perform error processing (78) and return to the status after commencement.

As mentioned above, when the volume of data in the buffer 24 has become equal to or less than the "buffer under run" threshold value, the host device 40 can ascertain the status of the status register by means of setting the ERR bit of the status register to "1."

As described in connection with FIG. 5, the host device 40 performs error processing when the ERR bit is 1. In this illustrated case, when the volume of data in the buffer has become equal to or less than the "buffer under run" threshold value, the ERR bit is set to 1. Accordingly, the host device 40 waits until the drive 10 recovers from the error status, without discarding data. When the drive 10 has recovered from the error status, transfer of subsequent data is commenced.

As mentioned above, when "buffer under run" occurs or when occurrence of "buffer under run" is predicted, rendering of a visible image can be spliced in a visually-smooth manner.

13. Application

A case of multiplication of the FG pulse (the S' pulse) is described as an application.

As mentioned previously, the S' pulse is a signal which is determined by means of subjecting the FG pulse to frequency division at an appropriate frequency dividing ratio and shows the accurate rotational position of the spindle. This signal is further subjected to frequency division, to thus generate an S" pulse signal which generates one pulse every rotation of the spindle. So long as the S" pulse is subjected to frequency multiplication by means of a PLL circuit or the like, a signal representing a larger number of accurate rotational positions of the spindle can be generated. By use of this signal, there can be obtained a larger number of positions per revolution where rendering can be started.

For instance, rendering operation can be caused to pause and resume on a per-transfer-unit basis by means of subjecting the S" pulse to X multiplication by use of X, which is the number of transfer operations per revolution. More specifically, rendering operation can be caused to pause and resume at eight positions during one revolution, so long as the embodiment shown in FIG. 2A is employed.

Moreover, the S" pulse is subjected to L multiplication by use of L (=X×N) which represents the number of sectors in one revolution, so that rendering can be caused to pause and resume on a per-sector-unit basis. In this case, the pause and resumption of rendering operation can be controlled at a unit which is finer than the transfer unit. Therefore, interruption of rendering, which will be induced by a cause other than a transfer rate such as disturbance, can also be sufficiently addressed.

What is claimed is:

1. An optical disk recording system comprising:
an optical disk;
an optical disk drive unit that includes a buffer storage portion that temporarily stores data transferable from a host device, and a rotating portion that holds and rotates the optical disk and outputs an angle position signal, the optical disk drive unit performing a recording operation to record on the optical disk a visible image corresponding to the data; and
the host device that is provided for transferring the data to the optical disk drive unit,
wherein the optical disk drive unit interrupts the recording operation when an error of data emptiness in the buffer storage portion occurs in the course of recording during a predetermined revolution of the optical disk, the host device resumes transfer of data after discarding data corresponding to a section between a position where the error occurs and a reference angle position on the optical disk, and the optical disk drive unit resumes receipt of data, to resume the recording operation from the reference angle position.

2. An optical disk recording system comprising:

an optical disk;

an optical disk drive unit that includes,
- a buffer storage portion that temporarily stores data transferable from a host device,
- a rotating portion which holds and rotates the optical disk and outputs an angle position signal,
- a signal processing portion which reads, from the buffer storage portion, data corresponding to a predetermined number of sectors during one revolution of the optical disk and which processes the read data, and
- a light-emitting portion that emits a laser beam at power responsive to the data processed by the signal processing portion to record the data on the optical disk; and the host device that transfers the data to the optical disk drive unit, and includes a count portion that counts the number of sectors of the data transferred to the optical disk drive unit, wherein the optical disk drive unit temporarily interrupts receipt of data from the host device when an error of data emptiness in the buffer storage portion occurs in the course of recording during a predetermined revolution of the optical disk, and sends a report to the host device and interrupts recording of data to the optical disk, wherein the host device specifies data corresponding to a section between a position where the error occurs and a start position of a next revolution, based on the number of sectors counted by the count portion when the error of data emptiness occurs in the optical disk drive unit and the predetermined number of the sectors, and resumes transfer of data after discarding the specified data, and wherein the optical disk drive unit resumes receipt of data to resume recording from the start position of the next revolution.

3. An optical disk recording system comprising:

an optical disk;

an optical disk drive unit that includes
- a buffer storage portion that temporarily stores data transferable from a host device,
- a rotating portion that holds and rotates the optical disk and outputs an angle position signal,
- a signal processing portion that reads, from the buffer storage portion, data corresponding to N×M, where N and M denote natural numbers during one revolution of the optical disk and processes the read data, and
- a light-emitting portion that emits a laser beam at power responsive to the data processed by the signal processing portion to record data on the optical disk; and the host device transfers to the optical disk drive unit the data corresponding to N sectors by one transfer operation, and includes a count portion that counts the number of operations for transferring data to the optical disk drive unit, wherein the optical disk drive unit temporarily interrupts receipt of data from the host device when an error of data emptiness in the buffer storage portion occurs in the course of recording during a predetermined revolution of the optical disk, and sends a report to the host device and interrupts recording of data to the optical disk, wherein the host device specifies the data corresponding to a section between a position where the error occurs and a start position of a next revolution, based on the number of transfer operations counted by the count portion when the error of data emptiness occurs in the optical disk drive unit and the number M, and resumes transfer of data after discarding the specified data, and wherein the optical disk drive unit resumes receipt of data, to resume recording from the start of the next revolution.

4. An optical disk recording system comprising:

an optical disk;

an optical disk drive unit that includes
- a buffer storage portion that temporarily stores data transferable from a host device,
- a rotating portion that holds and rotates the optical disk and outputs an angle position signal,
- a signal processing portion that reads, from the buffer storage portion, data corresponding to a predetermined number of sectors during one revolution of the optical disk and processes the read data,
- a light-emitting portion that emits a laser beam at power responsive to the data processed by the signal processing portion to record data on the optical disk, and
- a monitoring portion for predicting occurrence of an error of data emptiness stored in the buffer storage portion; and the host device for transferring the data to the optical disk drive unit, wherein, during the course of recording for a predetermined revolution of the optical disk, the optical disk drive unit: reports an anomaly to the host device when the monitoring portion predicts occurrence of an error of data emptiness in the buffer storage portion; temporarily interrupts receipt of the data from the host device; interrupts recording of the data on the optical disk after occurrence of an error of data emptiness in the buffer storage portion; subsequently resumes receipt of data from the host device; and resumes recording from a start position of a next revolution.

5. The optical disk recording system according to claim 4, wherein the monitoring portion includes a detection portion that detects a volume of data stored in the buffer storage portion and a volume of data output from the buffer storage portion, and predicts occurrence of an error of data emptiness in the buffer storage portion based on the volume of stored data, the volume of output data, and the predetermined number of the sectors.

6. The optical disk recording system according to claim 5, wherein, when a remainder obtained by dividing a total sum of the volume of stored data and the volume of output data by the predetermined number is zero and the volume of stored data is equal to or less than the volume of data corresponding to the predetermined number of sectors, the monitoring portion predicts occurrence of an error of data emptiness in the buffer storage portion.

7. An optical disk recording system comprising:

an optical disk;

an optical disk drive unit that includes
- a buffer storage portion that temporarily stores data transferable from a host device,
- a rotating portion that holds and rotates the optical disk and outputs M, where M denotes a natural number, angle position signals per revolution,
- a signal processing portion that reads, from the buffer storage portion, data corresponding to M×N sectors, where N denotes a natural number, during one revolution of the optical disk and processes the read data, and a light-emitting portion that emits a laser beam at power responsive to the data processed by the signal processing portion, to record the data on the optical disk; and the host device that transfers the data to the optical disk drive unit, and includes a count portion that counts the number of sectors of data transferred to the optical disk drive unit, wherein the optical disk drive unit temporarily interrupts receipt of data from the host device when an error of data emptiness in the buffer storage portion occurs in the course of recording during a predetermined revolution of the optical disk, and sends a report to the host device and interrupts recording of the data to the optical disk, wherein the host device specifies the data corresponding to a section between a position where the error occurs and a position specified by the angle position signal, based on the number N and the number of sectors counted by the count portion when the error of data emptiness occurs in the optical disk drive unit, and resumes transfer of the data after discarding the specified data, and wherein the optical disk drive unit resumes receipt of data to resume recording according to the angle position signal.

8. An optical disk recording system comprising:

an optical disk;

an optical disk drive unit that includes
  a buffer storage portion that temporarily stores data transferable from a host device,
  a rotating portion that holds and rotates the optical disk and outputs N×M, where N and M denote natural numbers angle position signals per revolution,
  a signal processing portion that reads, from the buffer storage portion, data corresponding to N×M sectors during one revolution of the optical disk and processes the read data, and
  a light-emitting portion that emits a laser beam at power responsive to the data processed by the signal processing portion to record data on the optical disk; and the host device that transfers the data to the optical disk drive unit, and includes a count portion that counts the number of sectors of the data transferred to the optical disk drive unit, wherein the optical disk drive unit temporarily interrupts receipt of data from the host device when an error of data emptiness in the buffer storage portion occurs in the course of recording during a predetermined revolution of the optical disk, and sends a report to the host device and interrupts recording of data to the optical disk, wherein the host device specifies data corresponding to a duration between a location where an error occurs and the angle position signal, from the number of sectors counted by the count portion when the error of data emptiness occurs in the optical disk drive unit, and resumes transfer of data after having discarded the specified data, and wherein the optical disk drive unit resumes receipt of data to resume recording from the start of a next revolution in accordance with the angle position signal.

9. A method of controlling an optical disk recording system that comprises an optical disk drive unit including a buffer storage portion that temporarily stores data transferable from a host device and a rotating portion that holds and rotates an optical disk and outputs an angle position signal, the optical disk drive unit performing a recording operation to record on an optical disk a visible image based on data, and the host device for transmitting the data to the optical disk drive unit, the method comprising:

transferring the data from the host device to the optical disk drive unit;

interrupting the recording operation by the optical disk drive unit when an error of data emptiness in the buffer storage means occurs in the course of recording during a predetermined revolution of the optical disk;

resuming transfer of data by the host device after discarding data corresponding to a section between a position where the error occurs and the reference angle position on the optical disk; and resuming receipt of data by the optical disk drive unit, to resume the recording operation from the reference angle position.

10. An optical disk drive unit for receiving data transferred from a host device and performing a recording operation to record on an optical disk a visible image corresponding to the data, the optical disk drive unit comprising:

a buffer storage portion that temporarily stores data transferable from the host device;

a rotating portion that holds and rotates the optical disk and outputs an angle position signal, wherein the recording operation is interrupted when an error of data emptiness in the buffer storage portion occurs in the course of recording during a predetermined revolution of the optical disk, and wherein the buffer storage portion resumes storing data, transferred from the host device, in which data corresponding to a section between a position where the error occurs and the reference angle position on the optical disk is discarded, to resume the recording operation from the reference angle position.

* * * * *

UNITED STATES PATENT AND TRADEMARK OFFICE
CERTIFICATE OF CORRECTION

PATENT NO. : 7,649,816 B2 Page 1 of 1
APPLICATION NO. : 11/476626
DATED : January 19, 2010
INVENTOR(S) : Itoga et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 874 days.

Signed and Sealed this

Twenty-eighth Day of December, 2010

David J. Kappos
*Director of the United States Patent and Trademark Office*